United States Patent [19]
Franz

[11] 3,936,522
[45] *Feb. 3, 1976

[54] PROCESS FOR THE PREPARATION OF INTERMEDIATES OF POLYADDITION AND POLYCONDENSATION RESINS

[75] Inventor: Peter Franz, Mumpf, Switzerland
[73] Assignee: Buss, A.G., Basel, Switzerland
[ * ] Notice: The portion of the term of this patent subsequent to Feb. 22, 1989, has been disclaimed.
[22] Filed: Aug. 20, 1973
[21] Appl. No.: 389,896

[30] Foreign Application Priority Data
Aug. 24, 1972 Germany............................ 2241616

[52] U.S. Cl................ 264/141; 264/169; 264/176 R
[51] Int. Cl.².............................................. D01D 1/00
[58] Field of Search................. 264/141, 169, 176 R

[56] References Cited
UNITED STATES PATENTS

| | | | |
|---|---|---|---|
| 2,582,294 | 1/1972 | Stober.................................... | 18/55 |
| 3,643,874 | 2/1972 | Franz..................................... | 241/3 |
| 3,769,379 | 10/1973 | Hinrichs................................. | 264/40 |

*Primary Examiner*—Lester L. Lee
*Attorney, Agent, or Firm*—Abraham A. Saffitz

[57] ABSTRACT

A process for preparing fusible, crosslinkable resinous intermediates of polyaddition and polycondensation resins consisting essentially of continuously proportioning and feeding a resin precursor composition in solid and liquid form, in a mixing and kneading machine, intensively mixing the resin precursor composition in both the longitudinal and transversal directions and simultaneously heating said composition, thereby plasticizing and homogenizing the same below the temperature of cross-linking and hardening and at a temperature of 50°–90° C during a brief average dwell time in the mixing chamber of said machine which will prevent excessive stiffening of the mixture in the form of a pasty mass to thereby plug the machine, continuously expelling the plasticized intermediate resin mix at a temperature of 50° to 90° C in the form of a pasty mass through a hollow die with twin conical outlet heated to a temperature of not more than 50° C. The intermediate resin mix which is expelled is cooled, solidified, preformed by a pair of rollers into a strand which is friable and is adapted to be broken by up grinding to form a powdered intermediate.

1 Claim, 1 Drawing Figure

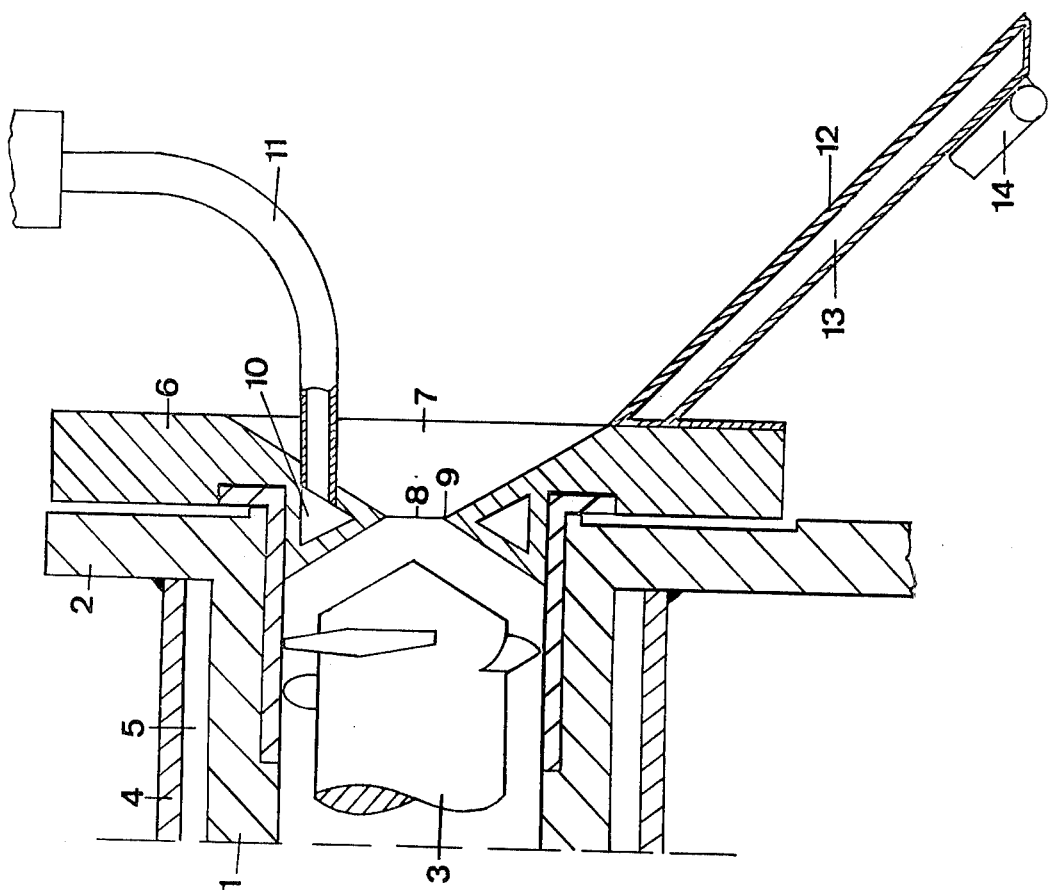

PROCESS FOR THE PREPARATION OF INTERMEDIATES OF POLYADDITION AND POLYCONDENSATION RESINS

BACKGROUND OF THE INVENTION a. Field of the Invention

The present invention refers to a process and apparatus for the preparation of intermediates of polyaddition and polycondensation resins. These are plastics which are prepared by the polyaddition reaction of one ore more resin precursors together with hardener and any other ingredients. The resultant intermediate resin then being obtained as a fine powder, wherein the resin macromolecules are not yet cross-linked, or have been allowed under control to develop the so-called partial cross-links only. This means of course that the most reactive hardener has not yet reacted, allowing the powder to be applied for example as thin homogenous layer to an object and then to be melt-fused to a homogenous coating, which is fully hardened, or respectively that the powder can be fused to desired form in a heated die resulting in fully hardened parts.

At least one of the resin precursors is a linear polymer, which by itself may not be hardenable, but which can accept in a polymeric addition reaction further monomers or polymers. The reaction proceedsstepwise and intermediate products show properties which progress from completely fuseable over partially fuseable to completely hardened and thermoset. The more important physical properties change as well, especially the melt viscosity and the brittleness. Nevertheless, highly reactive components remain in the intermediate products, sensitive to react under influence of temperature and sometimes also of pressure, though to a more limited extent.

The intermediates furthermore do not possess a sharply defined melting point and depending on the intermediate stage they have frequently a very broad melting range.

b. Description of the Prior Art

As known to those skilled in the art, a phase occurs during the preparation of the intermediate resin, where the components form a pasty to liquid mass showing pronounced adhesive tackiness. While the tacky mixture still retains these disadvantageous properties of adhesion and tackiness, the mass has to be passed through a die and then through forming rolls and onto a endless belt for quick cooling, and it has been disclosed, that by heating the die adhesive build-up in the die can be minimized and continuous processing would be possible. But experience with longer production runs has shown, that these measures alone will not be sufficient to prevent a block-up of the die after a number of hours with some formulations.

The previous art uses flat band-die outlets to give to the issuing band of material a profile as thin and wide as possible, so that the material having low thermal conductivity might be cooled quickly and evenly. But during extrusion through such a die a thin boundary layer forms, in which flow is retarded by contact with the walls of the die-land and therefore exposed for a somewhat longer period to the die temperature. This can provoke some hardening in the material depending on the reactivity of the resin mix, and with some material formulated highly reactive, hardening will build-up the boundary-layers in contact with the die-land, until the die opening is blocked-up. Depending on the reactivity this build-up is more or less retarded, but always ends with the interruption of the continuous production run.

Up to now one has used the expedient to have a second die in readiness for a quick exchange. The first die can then be cleaned of obstructions after the exchange, which forces nevertheless a short interuption of the production and is still highly undesirable. Another possibility, especially with the most desirable formulas, which are also the most reactive, is to run the production without a die at the end of the extruder. But this is not very economical, due to loss of not fully worked product during start-up, when it is difficult and takes appreciable time to reach equilibrium working conditions without the aid of a die.

OBJECTS OF THE INVENTION

It is the object of the present invention to propose a substantially improved process, which insures under any working condition, that the die will not block-up, even during continuous processing of highly reactive formulas and this for hours or days running.

SUMMARY OF THE INVENTION

The improvement is gained according to this invention by extruding the pasty product with a die held at maximum around 50° centigrade only and with the product at a temperature in the range from 50° to 90° centigrade, the exact product temperature depending on the reactivity of the formulation and on processing conditions.

In order to create an especially advantageous equipment combination to perform the new invention, the apparatus disclosed in U.S. Pat. No. 3,643,874 is substantially improved by using a heatable die of novel construction. This novel die has no die-lands, it is constructed as a round-strand die with a die opening with an acute edge, formed by the die throat sloping away on both the entry and excit sides.

In a preferred embodiment, this die may have a heatable wedge chute smoothly connecting to the exit side of the die, both bodies of die and wedge should be bored or made hollow for circulating a heating or cooling medium.

The details of the proposed process improvement will now be explained, using the attached drawing to illustrate by way of an example the novel die in cross section.

When developing the process described in U.S. Pat. No. 3,643,874 it was observed that the resin intermediates, homogenously prepared to contain only so-called partial links, have a very broad melting range, without a sharply defined melting point. They change slowly with increased temperature from molten pasty to a more fluid state of low viscosity. In the later state there is more pronounced tendency of some molecules to further cross-linking and hardening, but on the other hand the adhesive tackiness tends to diminuish strongly. At a lower temperature range approximately between 50° and 90° centigrade the state of the resin intermediates is a stiff paste with strong tackiness, but also no longer prone to cross-linking reactions with subsequent hardening. And then at temperatures below 50° centigrade the resin intermediates start to become brittle solids, completely solidified at room temperature, the show then little or no adhesiveness but would be prove to solidify in an extrusion die.

Up-to now, one has circumvented the thermically more safe but tacky phase at the excit of a continuous mixing and kneading machine, by maintaining the die hot enough, so that the material might issue from the die in the more liquid form and without tackiness. But this required to accept some hardening of the boundary layers in contact with the die surfaces, especially when processing highly reactive formulas.

DESCRIPTION OF THE PREFERRED EMBODIMENT

According to the new improved process, the intermediate resin is extruded in its stiff and pasty phase with a material temperature in the range from 50° to 90° centigrade, and through a die, held at approximately 45° to 50° centigrade on all its surfaces, which might be in contact with the extrudate. At these temperature there is no danger of some hardening occuring nor of material sticking to the die. But there could be danger of solidification and freezing to the die-lips. This danger has been effectively overcome by using an acute die construction like a knife-edge contrary to the many die-forms developed by the previous art. The dwell time in contact with this edge is partically nil and the absence of a proper die-land has the additional advantage of widely expanding the issuing strand of material, which can then be easely guided to the cooling stretch.

BRIEF DESCRIPTION OF THE DRAWING

A preferred embodiment of a die is illustrated by way of example on the attached drawing in cross-section, where 1 is the end of the housing of a continuous kneading and mixing machine, as for example disclosed in U.S. Pat. No. 3,219,320 of F. Sutter entitled "Method of Continuous Kneading and Mixing and an Arrangement for Carrying out the Method", but any other single — or multiple — screw extruder known to the art and having intensive mixing action in both longitudinal and transversal direction would be suited for the purposes of the present invention. The housing 1 of the drawing terminates with a flange 2 on the exit side. Within the housing is arranged a kneading and mixing screw 3 in a manner well known to the art. The housing 1 may have jackets 4 enclosing a space 5 in which a heating or cooling medium may be circulated.

A die 6 is mounted to the flange 2. The die has an outlet 7 in form of a twin-conical constricted throat 8 sloping away smoothly on both inlet and outlet sides of the die. The die between the two conical slopes is formed as a round opening having acute edges 9. The die body is made hollow 10 in the region of the construction, so that a heat transfer medium may be circulated connected by lines 11 and 11' (the latter not shown). This allows to maintain the die construction at a pre-set temperature.

Connected with a smooth fit to the die exit is a wedge chute 12, to lead away the issuing strand of material. The chute 12 is made hollow 13 so that a heat transfer medium may be circulated inside the chute, through lines 14 and 14' (the later now shown). Thus the chute can be maintained at a pre-set temperature similar as the die.

Examples:

1. In a process as described in the U.S. Pat. No. 3,643,874 of the previous art, resin intermediates were produced in continuous operation.

A formulation well known to the art, and selected to obtain a final full hardening in 60 seconds at 180° centigrade allowed 6 hours to run until the band-die was blocked-up to such an extend that the run had to be interrupted. An even more reactive formulation to obtain final hardening within 10 to 20 seconds at 180° centigrade was economically not possible with a band-die which blocked-up in a very short time. Runs without a die were possible, but only with the disadvantage of loss of intermediate resin precursor material not being fully worked during the lengthy start-up, when it is diffucult and takes appreciable time to reach equilibrium working conditions.

2. Test runs using the processing method and equipment according to the present invention produced the following result with a highly reactive formulation, selected for its known processing difficulty:

Final hardening time of the produced intermediate resin: 10–20 seconds at 180° centigrade
Product paste temperature 80°C
Die temperature 45°C
Wedge chute temperature 45°C
Duration of test run 6 hours
Final product quality: perfect flow, hardness and colour
Condition of the die after 6 hours operation: free from any traces of deposited material, in perfect operation condition.

What I claim is:

1. A process for the preparation of fusible resinous intermediates of fully cross-linkable polyaddition and polycondensation resins, consisting essentially of:
   continuously proportioning and feeding the resin precursor composition containing one of the precursors as a linear polymer, in solid or liquid form, in a mixing and kneading machine;
   intensively mixing the resin precursor composition in both the longitudinal and transversal directions and simultaneously heating said composition, thereby plasticizing and homogenizing the same below the temperature of cross-linking and hardening and at a temperature of 50° to 90° C during a brief average dwell time in the mixing chamber of said machine which will prevent stiffening of the mixture whereby the mixture is in the form of a pasty mass at a temperature of about 50° to 90°;
   continuously expelling the plasticized pasty mass at said temperature of 50° to 90° C through a hollow heated die having an outlet in the form of a twin conical throat with acute edges sloping away smoothly at inlet and outlet sides to a temperature of not more than 50° C;
   preforming said expelled mass between a pair of rollers to form a strand;
   cooling and solidifying the expelled strand into a friable state; and,
   breaking up and grinding said strand into a powder adapted to fuse and cross-link.

* * * * *